Figure 1:
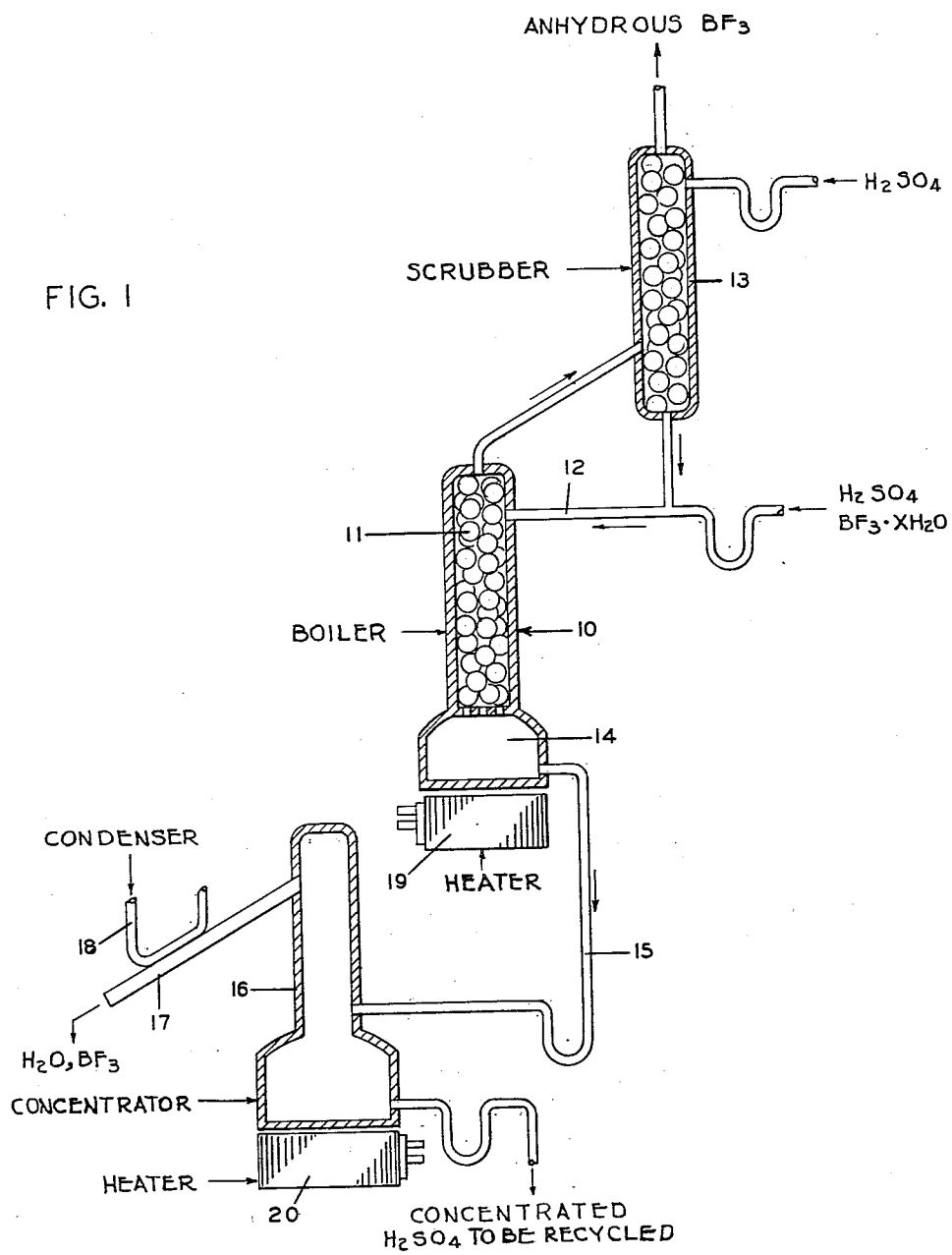

Sept 10, 1957 C. F. SWINEHART ET AL 2,805,982
PREPARATION OF BORON TRIFLUORIDE
Filed Jan. 5, 1951 2 Sheets-Sheet 1

C.F. SWINEHART
and
F. J. BURTON JR.
INVENTORS

BY William H Brown
ATTY.

Sept 10, 1957 C. F. SWINEHART ET AL 2,805,982
PREPARATION OF BORON TRIFLUORIDE
Filed Jan. 5, 1951 2 Sheets-Sheet 2

C. F. SWINEHART INVENTORS.
F. J. BURTON
BY
William H. Brown 2,805,982
Patented Sept. 10, 1957

2,805,982

PREPARATION OF BORON TRIFLUORIDE

Carl F. Swinehart, University Heights, and Frederick J. Burton, Jr., Bay Village, Ohio, assignors to The Harshaw Chemical Company, Cleveland, Ohio, a corporation of Ohio Application January 5, 1951, Serial No. 204,538

3 Claims. (Cl. 202—42)

This invention relates to the preparation of boron trifluoride, and more particularly to a cyclic process for separating mixtures of boron trifluoride and water.

An ancient process for the preparation of $BF_3$ consisted in heating a dry mixture of $B_2O_3$ and $CaF_2$ which, at a high temperature, reacted to give $BF_3$ (16% yield) and CaO ($B_2O_3 + 3CaF_2 \rightarrow 2BF_3 + 3CaO$). Baldeschwieler (U. S. Patent No. 2,163,232) proposed to increase the proportion of $B_2O_3$ to $CaF_2$ to about 1:1 to 3:1, thereby increasing the yield to about 60% to 70%. The operating temperature, however, remained high (900° C. to 1200° C.), and dehydration of boric acid to boric oxide was an undesirable preliminary step. It has been proposed, also (U. S. Patent 1,898,532) to react boric acid with $CaF_2$ and $SO_3$ in concentrated sulfuric acid.

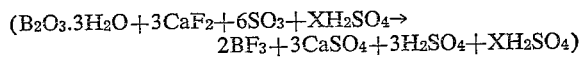
$2BF_3 + 3CaSO_4 + 3H_2SO_4 + XH_2SO_4$)

In this reaction, as in the previous ones, the impurities of fluorspar constitute a problem and a new problem is introduced, viz., $H_2SO_4$ is generated by the process. Since $BF_3$ is soluble in $H_2SO_4$, the by-product sulfuric acid is impure. If $SO_3$ is supplied by means of the use of oleum, there results a still greater quantity of impure, by-product $H_2SO_4$. In the same patent it is proposed to react boric acid with fluosulfonic acid with or without sulfuric acid.

$$(B_2O_3 \cdot 3H_2O + 6HSO_3F \rightarrow 2BF_3 + 6H_2SO_4)$$

This reaction also generates relatively large quantities of by-product sulfuric acid which will contain $BF_3$ dissolved therein. During the last few years, work has been done on the fluosulfonic acid reaction (U. S. Patent 2,416,133) with a view to reduction of the loss of $BF_3$ with the by-product sulfuric acid. The $BF_3$ content of the $H_2SO_4$ was reported as of the order of 1% under favorable conditions, but the problem of disposition of the impure by-product $H_2SO_4$ was not solved.

The above described processes are representative of the type which rely upon the use of water-free reactants, or prevent the formation of water during the reaction, or use up in the reaction the water which is present or formed. Other theoretically possible preparations are known, such as heating fluoborates with $B_2O_3$ and sulfuric acid, decomposing fluoborates by means of heat, fluorinating boron or its compounds with elemental fluorine or halogen fluorides. These involve, high temperature, production of fluorine, or the formation of by-product sulfuric acid contaminated with $BF_3$.

Another line of endeavor has been along the line of formation of $BF_3$-water compositions and separating the $BF_3$ from the water, suitable reactions being

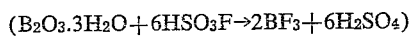

and $B_2O_3 + 6HF \rightarrow 2BF_3 + 3H_2O$. These are perhaps the most feasible reactions for the production of mixtures of $BF_3$ with water and, for processes where aqueous $BF_3$ of such concentrations can be used, constitute a complete answer to the problem. Where anhydrous or more nearly anhydrous $BF_3$ is needed, the necessity for separating the $BF_3$ from water arises, and the provision of a process for accomplishing this purpose in a practical way has proved to be very difficult.

Obviously, the aqueous $BF_3$ or $BF_3$ hydrate can be treated with oleum or $SO_3$ or $HSO_3F$, and $BF_3$ will be liberated, but $BF_3$-contaminated by-product sulfuric acid will be formed and will need to be disposed of as waste unless by some fortunate circumstance it can be used in some other process.

No $BF_3$ can be recovered from $BF_3 \cdot 3H_2O$ by distillation, and only a little can be recovered from $2BF_3 \cdot 3H_2O$ on boiling because the $BF_3$-rich fraction ceases to be evolved when the ratio in the boiler is about $BF_3 \cdot 2.4H_2O$. Further fractionation separates this into two azeotropic mixtures, one having a slight excess of $H_3BO_3$ and boiling at 160° C., and the other, with a slight excess HF, boiling at 170° C. Either of these azeotropes, when adjusted to the boron to fluorine ratio of $BF_3$, yields approximately $BF_3 \cdot 2.4H_2O$. Consequently either azeotrope or a mixture of them may be regarded as the barrier composition interfering with the separation of $BF_3$ from water by distillation methods.

The slight concentration of HF or $B_2O_3$ present as the case may be results in a three-component mixture having only very little of the third component present. This is the reason for the two azeotropes. Hereinafter no distinction will be made and it will be assumed that there is only one azeotrope, viz., $BF_3 \cdot 2.4H_2O$. This over-simplification is justified in the present instance since the objective is the separation of $BF_3$ from water and the two azeotropes are of almost the same composition.

It is an object of our invention to provide a process for the preparation of $BF_3$ wherein sulfuric acid is employed as a means of breaking the azeotrope but is recycled so that no large quantity of $BF_3$ is lost by solution in the acid, and no large quantity of by-product sulfuric acid has to be disposed of.

A further object of the invention is to make available a process which is adapted for efficient use with readily available materials and with a minimum of processing.

A still further object is to provide such a process which introduces a minimum of impurities into the product, and wherein the build-up of impurities in the cycling material is not excessive.

Figure 2:
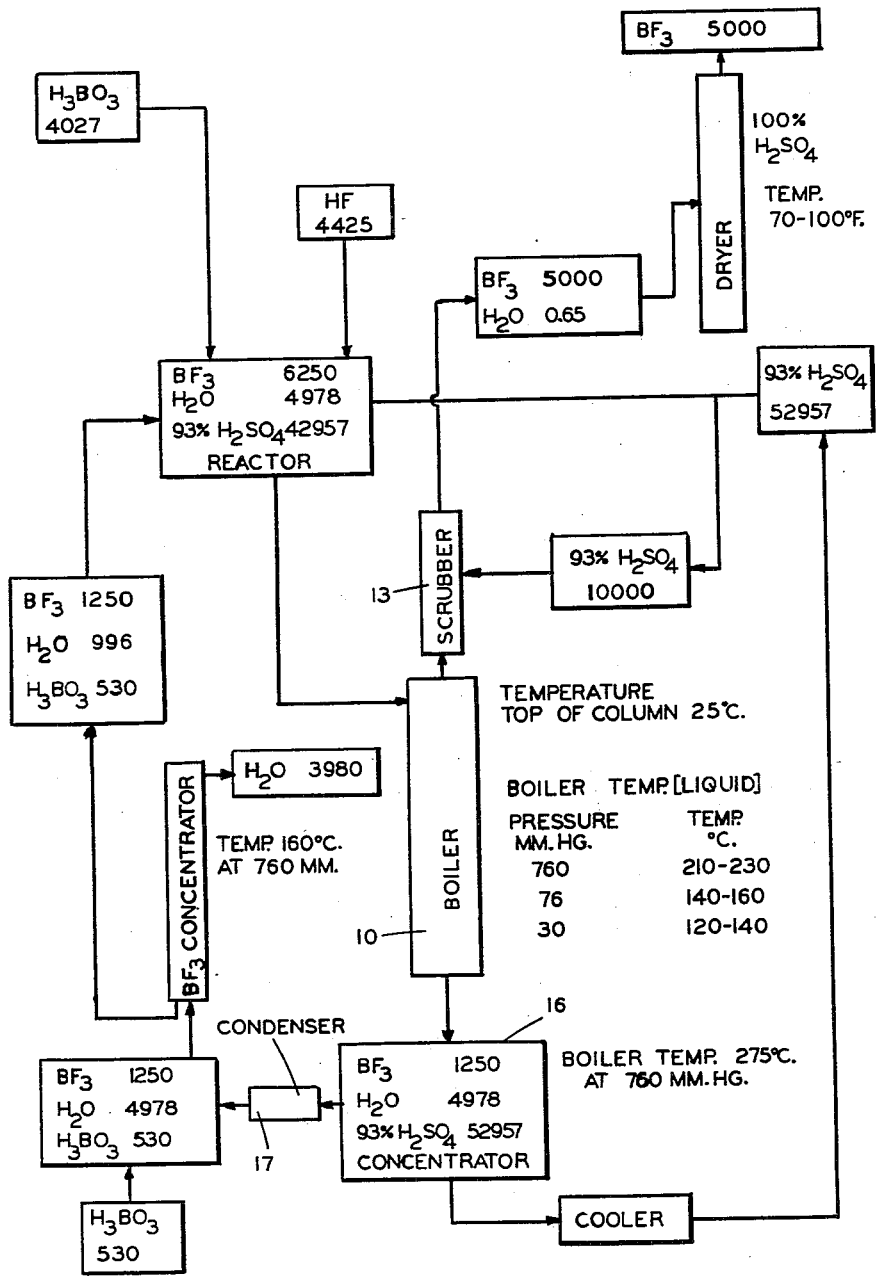

With the foregoing and other objects in view which will be in part obvious and in part set forth hereinafter, the invention consists in all the novel features disclosed in this description and the appended claims and illustrated in the accompanying drawings wherein Fig. 1 is a diagrammatic representation of the principal elements of equipment used in one embodiment of our process, and Fig. 2 is a flow diagram illustrating more completely the sequence of steps and flow of materials in the operation of such embodiment.

We have now discovered a process by means of which we are able, as a continuous distillation process, to effect the separation of $BF_3$ from water, using sulfuric acid to break the azeotropes and recycling such acid repeatedly. We sought to drive off anhydrous $BF_3$ from mixtures of $BF_3$, $H_2O$ and $H_2SO_4$ by simply placing such mixtures in a vessel provided with a reflux tower and heating it, but we were unable to obtain satisfactory yields. We did obtain a satisfactory result by selecting a liquid feed of suitable proportions of $BF_3$, $H_2O$ and $H_2SO_4$, heating it to its boiling point whereby vapor was evolved and the composition of the liquid phase was changed, passing the resulting, progressively higher boiling liquid phase progressively to regions of temperature equal to its progressively increasing boiling point and continuously passing the vapors evolved countercurrent to the liquid phase. The result was the evolution of substantially all the $BF_3$ into the exit vapor, and the collection of substantially all the $H_2SO_4$ and $H_2O$ into the liquid phase from which the water was boiled out so that the acid could be recycled.

The process thus abstractly stated can be understood perhaps more readily by reference to a concrete embodiment such as will now be specifically described with reference to the drawings for aid in visualization of suitable equipment, sequence of steps, and material balance.

The feed is introduced into the tower or column 11 of the boiler 10, being supplied through a suitable conduit 12. It may be derived partly from sulfuric acid which has passed through a scrubber 13 in contact with the $BF_3$ leaving the system. The function of such a scrubber is to remove small traces of water carried along with the $BF_3$ gas. The scrubber is optional and may be omitted although its use is beneficial and the entire feed can be introduced through it, if desired. The feed is introduced preferably at or near the top of the column 11, which may be packed with carbon or other suitable packing, and is heated by ascending vapors. The liquid phase progresses downwardly, losing $BF_3$ to the vapor phase until it is low in $BF_3$ in the kettle portion 14 of the boiler 10. The mixture of $H_2SO_4$ and water, with a small amount of $BF_3$ which finds its way into the kettle 14, is continuously drained off by the conduit 15 to the concentrator 16 where the water and $BF_3$ are distilled off until the concentration of the acid is suitable for recycling. If there is sufficient $BF_3$ in the distillate issuing from the cooled tube 17, it may be boiled down to suitable concentration for addition to the feed since mixtures of $BF_3$ and water which are high enough in water will lose water upon fractionation until a constant boiling mixture is reached. It will be understood that the tube 17 is cooled by passing cooling water through the tube 18 which is welded thereto. The necessary heat is supplied to the boiler 10 by the heater 19 and to the concentrator 16 by the heater 20. Since the feed will, as hereinafter more fully explained, contain a high proportion of $H_2SO_4$, its boiling point will be above the boiling point of water (e. g. from 125° C. to 150° C. depending upon the proportion of $H_2SO_4$). Nevertheless, the exit vapor is very low in water vapor by reason of the fact that the vapor pressure of water over concentrated sulfuric acid is very low. The feed in the tube 12 may be at or near its boiling point, but this is not essential since the feed will, if it enters the column at a lower temperature, merely reach its boiling point at a lower level therein, and that portion of the column above the point at which the liquid phase reaches its boiling point will serve as a heater for the feed and as a scrubber for ascending $BF_3$ gas. The essence of the portion of our process which is carried out in the boiler 10 can perhaps be illuminated by supposing that the kettle portion 14 of the boiler 10 is eliminated altogether and the column portion 11 thereof is elongated considerably. In that case the lower end of the column would be heated by any suitable means such as a steam jacket or electric resistance heater surrounding the column, the pool of liquid in the kettle 14 would be absent, and the liquid phase would pass directly to the concentrator 16. This variation has been actually tried and found to operate in substantially the same way as with the equipment shown. Thus, essentially what happens in the boiler 10 is as follows. The feed liquid spreads over the packing in the column (suitably carbon tubes ¼" O. D. by ¼" high with 1/16" wall thickness) and is heated up to its boiling point. $BF_3$ is lost to the vapor phase. A small amount of water passes to the vapor phase, and some water is absorbed by the liquid phase. The loss of $BF_3$ results in increasing the boiling point of the liquid phase. The passing of the liquid phase downwardly to a hotter zone increases its temperature again to its boiling point and thus, as each portion of the feed liquid moves downwardly, it progressively loses $BF_3$ until finally the liquid phase is aqueous sulfuric acid containing very little $BF_3$. This result is, however, absolutely dependent upon the fresh portions of incoming feed to maintain near the top of the column a liquid phase composition capable of reabsorbing water vapor evolved below and, of course, the evolution of water vapor all along the column is the most convenient way of maintaining the temperature gradient along the column which is essential to the result. (Removal of the correct amount of water vapor from the boiler reconcentrates the sulfuric acid for recycling.) Thus, it was only through the concept of a continuous feed passing countercurrent to evolved vapors that we were able to achieve the essential treatment of a $BF_3$—$H_2O$—$H_2SO_4$ composition, and thus establish the conditions essential to the separation of $BF_3$ therefrom. No less important was the concept of recycling substantially all of the sulfuric acid, which would necessarily be contaminated with $BF_3$ to some extent, so as to avoid a problem of $H_2SO_4$ disposition and, indeed, the possibility of such recycling was from the beginning one of the prime objectives. So far as we are aware, no one has heretofore proposed to break the $BF_3$—$H_2O$ azeotrope by means of sulfuric acid, nor, of course, to break it by means of sulfuric acid with recycling of the acid and avoidance of build-up of $H_2SO_4$.

In order to attain our objectives of a cyclic process involving a continuous feed of a $BF_3$—$H_2O$—$H_2SO_4$ composition, it became necessary to ascertain whether any composition of these materials could be found which would be suitable for the treatment to which we planned to subject it. It was found that such compositions can be prepared. In general, they are high in $H_2SO_4$. For best results, the feed composition should be chosen so that the composition of the liquid phase leaving the column 11 will be from 85% to 90% by weight $H_2SO_4$. The upper limit of 90% is chosen because 98% is the constant boiling mixture of $H_2O$ and $H_2SO_4$ and, consequently, is the greatest concentration which will be produced under normal conditions in the concentrator 16, and a good working margin between the feed composition and the concentrator composition is desirable. In the cyclic process, the acid produced by the concentrator will be the principal source of sulfuric acid used in making up the feed. There will be a slight loss of $H_2SO_4$ in the process and this will be made up by the addition of fresh acid to the feed. Such fresh acid would normally be of the same concentration as that produced in the concentrator 16, but it could be of a different concentration, either weaker or stronger, even oleum or $SO_3$ gas. Such variations would be merely obvious equivalents. Also constancy of feed composition is not essential to success. The lower limit of 85% is merely a preferable lower limit.

It is not absolutely essential that the kettle product passing from the boiler 10 to the concentrator 16 be free from or very low in $BF_3$. That is merely the cheapest and most desirable situation. Good results, though more expensive, can be produced when the feed is selected so that the kettle product in the kettle 14 is as low as 60% $H_2SO_4$, having regard only to the $H_2SO_4$ and $H_2O$ content and disregarding the $BF_3$ content. In such case substantial quantities of $BF_3$ will pass to the concentrator 16 and a mixture of $BF_3$ and water will pass out through the tube 17. Such mixture can be fractionated down to an azeotrope (61% by weight $BF_3$), or as near thereto as may be found practical and incorporated in the feed composition. At best there is a small amount of $BF_3$ in the water vapor evolved in the boiler 16 and this method is available for saving it. It may be possible, however, to reduce the amount of $BF_3$ coming from the concentrator 16 to such a low proportion that it can be discarded without undue expense and without creating a disposal nuisance. Fractionation of the concentrator vapors and return of the resulting small quantity of $BF_3$- water composition to the feed is a readily available solution of the disposal problem. Thus, the limits of H₂SO₄ to H₂O proportions in the feed which we have found practicable are such that the H₂SO₄ is from 60% to 90% of the combined weight of H₂SO₄ and H₂O with a preferred range being from 85% to 90%, and a range from 75% to 90% giving quite good results. The most practical sources of BF₃ are indicated by the two reactions:

(1)   $\frac{1}{2}B_2O_3 + 3HF \rightarrow BF_3 \cdot 1\frac{1}{2}H_2O$,
(2)   $H_3BO_3 + 3HF \rightarrow BF_3 \cdot 3H_2O$.

It is within the contemplation of the invention to introduce only the sulfuric acid at the top of the column, the BF₃—H₂O component of the feed being introduced at the bottom of the column. The evolved vapors will then all pass counter-current to the H₂SO₄ whereby the H₂O is absorbed and the BF₃ will be nearly water-free at the top of the column. The BF₃—H₂O component of the feed may be in the form of a hydrate or in the form of H₃BO₃ and HF or B₂O₃ and HF or the like, since it is immaterial whether the source materials react before introduction to the column or in the column. Accordingly, when we refer to H₂O and BF₃, we intend to include the hydrates of BF₃ and materials which will yield BF₃ and H₂O on being brought together in the still.

The process may be carried out at atmospheric pressure, or under vacuum, or even somewhat above atmospheric pressure. We prefer to operate either at or below atmospheric pressure. The results of operation under vacuum are especially favorable in respect to the contamination of the product by sulfur dioxide. For some uses the material may not need to be exceptionally pure, while for others sulfur dioxide may be quite undesirable. Using inconel apparatus and reducing the pressure to 100 mm. of mercury, absolute, the SO₂ content may be reduced below ½%, whereas the same equipment, operating at atmospheric pressure, may produce a product containing more than 1½% SO₂. It will thus be seen that when a substantial portion of the market demands the lowest possible content of SO₂, it may be justifiable to reduce the pressure. It may not, however, be advisable, even when vacuum operation is indicated, to go as low as 100 millimeters since the relation between the degree of vacuum and the SO₂ content is not a straight line function. For example, in one instance, where operation at one atmosphere yielded a product containing 1.55% SO₂, operation at 300 millimeters yielded a product containing only 0.55% SO₂, and operation at 100 millimeters yielded a product containing 0.46% SO₂. It can be seen that the gain in purity represented by the difference between 300 millimeters and 100 millimeters might not be sufficient to justify the cost of operating at the lower pressure. The presence of SO₂ is related to corrosion of the equipment which is in turn variable with temperature. By placing the system under vacuum, the distillation can be accomplished at a lower temperature with consequent decrease in corrosion.

Reference is made to Fig. 2 by way of specific example, the amounts of various materials and conditions at various parts of the system being indicated. It will be noted that a total of 4,557 pounds of H₃BO₃ and 4,425 pounds of HF are added. This indicates parts by weight per unit of time, the process illustrated being continuous and the values of the weight and time units being dependent upon the size of the operation. In the reactor, the H₃BO₃ and HF react to form BF₃-hydrate or BF₃ and H₂O which, in admixture with H₂SO₄ forms the feed to the boiler 10. Some of the H₂SO₄ may reach the boiler 10 by way of the scrubber 13, or the entire feed may be passed through the scrubber to the boiler or directly to the boiler, eliminating the scrubber. It will be noted that the H₂SO₄ cycles continuously, theoretically none being added and none being lost. In practice a small amount will be lost and will have to be replaced. Notations as to temperature and pressure in the boiler 10 indicate suitable conditions for the liquid as it leaves the hot zone at the bottom 14 of the boiler. The temperature of the top of the BF₃ generator should be below 150° C. and desirably as low as 25° C.

The functions of the boiler 10 and the sulfuric acid concentrator 16 are described above in connection with Fig. 1. The drier (see Fig. 2) through which the product is passed is an optional feature, and may be used or omitted depending upon whether a trace of moisture can be tolerated in the product. Likewise the BF₃ concentrator 16 is a more or less optional feature depending upon the separating efficiency at which boiler 10 is operated. Better efficiencies per cycle than that shown in Fig. 2 are possible. The BF₃ concentrator is indicated as operating on the boric acid side. It could be operated on the HF side, boiling to approach the 170° C. azeotrope or simply boiled down to a concentration of about BF₃·3H₂O without control of ratio.

Having thus described our invention, what we claim is:

1. A continuous process for the preparation of anhydrous boron trifluoride comprising the steps of passing continuously into a distillation column, above the bottom thereof a liquid feed composition comprising BF₃, H₂O and H₂SO₄, the proportion of H₂SO₄ in said feed being sufficient to break the azeotrope which is formed between H₂O and BF₃ at approximately 2.4 molecules of H₂O for each molecule of BF₃, said feed containing H₂SO₄ in proportion from 60% to 90% of the combined weight of H₂SO₄ and H₂O therein, heating said column by application of heat to the kettle therebelow whereby to establish a temperature gradient in said column, enrich the vapor phase with respect to BF₃ and drive water vapor upwardly through the lower portion of said column, continuously passing the progressively higher boiling liquid phase to regions of said column respectively maintained at temperatures equal to its progressively increasing boiling point and continuously passing the evolved vapors countercurrent to and in contact with the liquid phase through said regions of said column in reverse order to the liquid phase, thereby establishing a nearly adiabatic column, continuously removing the liquid phase poor in BF₃ from the kettle and collecting the resulting substantially anhydrous BF₃.

2. A process according to claim 1 wherein the pressure in said heating zone is maintained below 1 atmosphere.

3. A process according to claim 1 wherein the pressure in said heating zone is maintained below 300 millimeters of mercury absolute.

References Cited in the file of this patent
UNITED STATES PATENTS

| | | |
|---|---|---|
| 1,184,926 | Collett | May 30, 1916 |
| 1,772,122 | Zeisberg | Aug. 5, 1930 |
| 1,772,123 | Zeisberg | Aug. 5, 1930 |
| 1,865,204 | Otto et al. | June 28, 1932 |
| 1,895,012 | Spangler | Jan. 24, 1933 |
| 1,898,532 | Hardtmann | Feb. 21, 1933 |
| 1,921,255 | Hechenbleikner | Aug. 8, 1933 |
| 2,148,514 | Swinehart | Feb. 28, 1939 |
| 2,160,576 | Loder | May 30, 1939 |
| 2,196,907 | Swinehart | Apr. 9, 1940 |
| 2,324,955 | Rupp et al. | July 20, 1943 |
| 2,697,027 | Swinehart et al. | Dec. 14, 1954 |

OTHER REFERENCES

Mellor: Comprehensive Treatise on Inorganic and Theoretical Chemistry, vol. 5, p. 121, Longmans, Green and Co., London, copyright 1924.